United States Patent [19]

Ballance

[11] Patent Number: 5,138,635
[45] Date of Patent: Aug. 11, 1992

[54] NETWORK CLOCK SYNCHRONIZATION

[75] Inventor: John W. Ballance, Woodbridge, England

[73] Assignee: British Telecommunications Public Limited Company, London, United Kingdom

[21] Appl. No.: 479,433

[22] Filed: Feb. 14, 1990

[30] Foreign Application Priority Data

Feb. 16, 1989 [GB] United Kingdom ............ 8903567.9

[51] Int. Cl.$^5$ ............................................. H04L 7/02
[52] U.S. Cl. ................................. 375/107; 375/109; 375/119
[58] Field of Search ............... 375/106, 109, 110, 107, 375/118, 119; 370/100.1, 105, 105.1, 108; 340/825.14

[56] References Cited

U.S. PATENT DOCUMENTS

| | | | |
|---|---|---|---|
| 3,309,463 | 3/1967 | Roedl | 375/114 |
| 4,012,598 | 3/1977 | Wiley | 375/118 |
| 4,807,259 | 2/1989 | Yamanaka et al. | 375/109 |
| 4,893,318 | 1/1990 | Potash et al. | 375/109 |
| 4,912,706 | 3/1990 | Eisenberg et al. | 370/105.1 |

FOREIGN PATENT DOCUMENTS

| | | | |
|---|---|---|---|
| 0038749 | 3/1980 | Japan | 375/109 |
| 2160391 | 12/1985 | United Kingdom | 375/109 |
| 05233 | 7/1988 | World Int. Prop. O. | |

*Primary Examiner*—Benedict V. Safourek
*Attorney, Agent, or Firm*—Nixon & Vanderhye

[57] ABSTRACT

In a network including an exchange having a masterclock and a number of subscriber stations connected to the exchange, the exchange includes a delay line which receives incoming data. Samples are taken from different taps of the delay line and the tap carrying data in phase with the masterclock is identified and used to output data. In a preferred example, the network is an optical network carrying data cells.

15 Claims, 3 Drawing Sheets

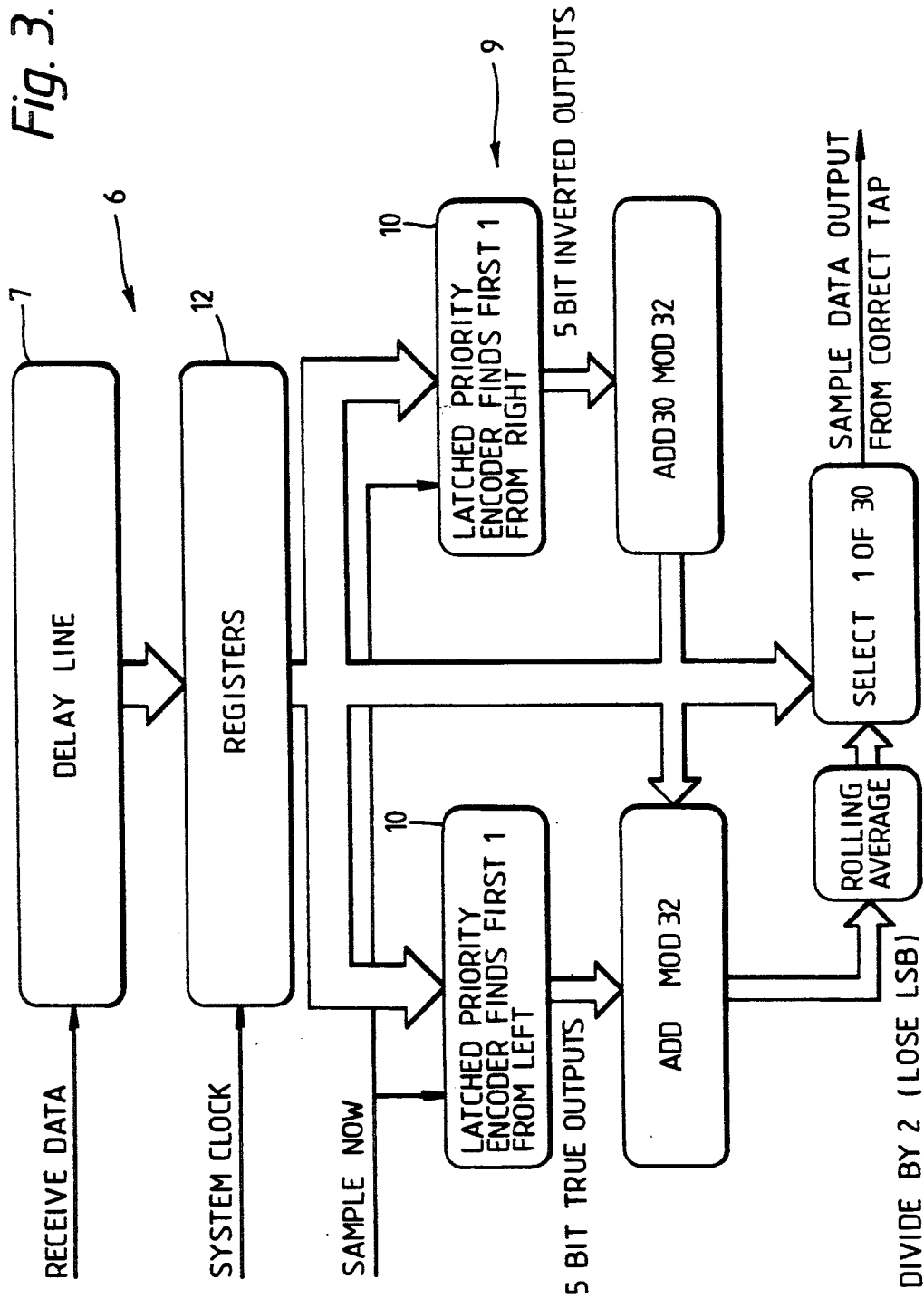

NETWORK CLOCK SYNCHRONIZATION

FIELD OF THE INVENTION

The present invention relates to networks in which data is communicated between a central exchange and a number of remote subscriber stations. It is particularly concerned with systems such as optical networks in which packets of data are transmitted at high bit rates.

BACKGROUND OF THE INVENTION

Optical networks are commonly installed to provide a TPON (Telephony on Passive Optical Network) service. In a typical TPON system the transmission of data is synchronized by a masterclock in the exchange. At the customer end the clock is recovered using a conventional phase lock loop (PLL). When data is transmitted back from the subscriber station to the central exchange it is possible to time the transmission to an accuracy of one tenth of a clock cycle: at a typical TPON bit rate of 20 Mbit/s this requires an accuracy of ± 5 ns. The required timing accuracy is readily achievable using conventional circuitry of modest cost. Since the system clock is accurately recovered and used by the subscriber stations for the transmission of data back to the exchange, the exchange can simply use its local clock in handling the incoming data and no further clock recovery is needed. A single clock is used throughout the system making it possible to use the TPON in bit interleave mode which reduces the demands made on the subscriber station laser and brings benefits in terms of cost and reliability.

One example of such a system in which subscriber stations recover the masterclock frequency from received data, and transmit data cells back to the exchange at that masterclock frequency is disclosed in the present Applicant's published earlier application no. WO-A-88/05233. A further feature of this system is that control signals may be sent from the exchange to a subscriber station to advance or retard the timing of transmission from the subscriber station.

In practice rather than having a network dedicated to telephony it is desirable to be able to use the system at the same time for other forms of traffic such as high bit-rate data transmission at a wavelength separated from that used for telephony. However at the data-rates typically used for such traffic, which may, for example, be around 150 Mbit/s, it proves difficult to recover the clock with sufficient speed. It is possible for the subscriber stations to retrieve the clock accurately using a conventional PLL and this is sufficient for the reception of data from the exchange. However the recovered clock has an arbitrary phase difference with respect to the masterclock dependent on the transmission distance between the exchange and the subscriber station. The realignment of the phase to an accuracy of the order of one tenth of a clock cycle or ± 0.6 ns in the time available could only be achieved by using circuitry of a cost and complexity wholly unsuitable for commercial applications. It can, for example, be shown that to recover the clock with such an accuracy within the few bits of a clock lead-in using a conventional PLL would require a voltage control oscillator capable of covering the range from 74 to 226 MHz, which is beyond the capabilities of most such devices. Moreover the transmission of data with this degree of timing accuracy would also require the use of frequent timing updates to correct for variations in fibre delay characteristics caused by temperature fluctuations.

By contrast with the systems described above, U.S. Pat. No. 4,012,598 discloses a receiver for use in a system with independent clocks in the receiver and in transmitting station. Since the frequency of the receiver clock is in general imperfectly matched to that of the transmitter clock there is a continual phase drift in the received data. In order to correct for this drift a delay line is provided with different output taps. For each pulse of the received data the phases of the different current outputs and preceding outputs are compared with the local clock and the output with optimal pulse durational phase chosen. Since the phase drift is continual a fresh determination has to be made for every pulse.

SUMMARY OF THE INVENTION

According to the present invention, there is provided a network comprising an exchange having a masterclock and a number of subscriber stations connected to the exchange and arranged to communicate data cells with the exchange, the subscriber stations being arranged to recover the masterclock frequency from data received from the exchange and to transmit data to the exchange at that masterclock frequency, the exchange including a delay line arranged to receive incoming data cells, means to sample data from different taps of the delay line and means to determine from the sampled data which tap carries data optimally in phase with the masterclock and to select that for outputting a data cell accordingly.

The present invention provides a system with a combination of features which together overcome the disadvantages of the above described systems.

The present invention uses a single clock in the head-end station but instead of attempting to recover an appropriate clock for the incoming data uses a delay line to provide a progressive delay for the data, and then identifies the tap from the delay line which carries data having a phase appropriate to the masterclock. In this manner the exchange is capable of handling data transmitted from subscriber stations with a phase which varies arbitrarily with respect to the system clock. It is therefore sufficient for the subscriber stations to time the retransmission of data to an accuracy of no more than one clock cycle. At the same time, because the entire system is locked to a single masterclock frequency there is not the continual phase drift encountered with systems such as that described in the above cited U.S. patent. It is therefore sufficient for a single phase determination to be made for an entire cell transmitted by a given termination.

The choice of a tap to output a current cell may be made on the basis of determinations made for one or more preceding cells from the same subscriber station.

Preferably the data cells transmitted by the subscriber stations include a header portion having a predetermined bit pattern and the means to determine includes means to identify the position of the predetermined bit pattern within the sampled data and to select the appropriate tap accordingly.

Preferably the means to determine further includes means to transmit control signals to the subscriber stations to retard the transmission of cells from the subscriber stations when the predetermined bit pattern is found to be advanced with respect to the centre of the delay line and to advance the transmission of the cells when the predetermined bit pattern is determined to be retarded with respect to the centre of the delay line.

Preferably the means to determine are arranged to be strobed at the cell transmission rate of the subscriber stations.

Preferably the network is an optical network.

According to a second aspect of the present invention there is provided a method of communicating data in a network having an exchange including a masterclock and a number of subscriber stations connected to the exchange, comprising transmitting data from the exchange to the subscriber station, recovering the masterclock frequency at the subscriber stations from the transmitted data, transmitting a data cell from a subscriber station to the exchange at the masterclock frequency, at the exchange applying different progressive delays to a received data cell thereby providing a plurality of different outputs having different respective phases, sampling the different outputs to determine which is optimally in phase with the masterclock and outputting a data cell from a selected one of the outputs accordingly.

BRIEF DESCRIPTION OF THE DRAWINGS

A system in accordance with the present invention is now described in detail with respect to the figures of the accompanying drawings in which:

FIG. 3 is a diagram showing dataflow in the circuit of FIG. 2;

DETAILED DESCRIPTION OF THE DRAWINGS

Figure 1:
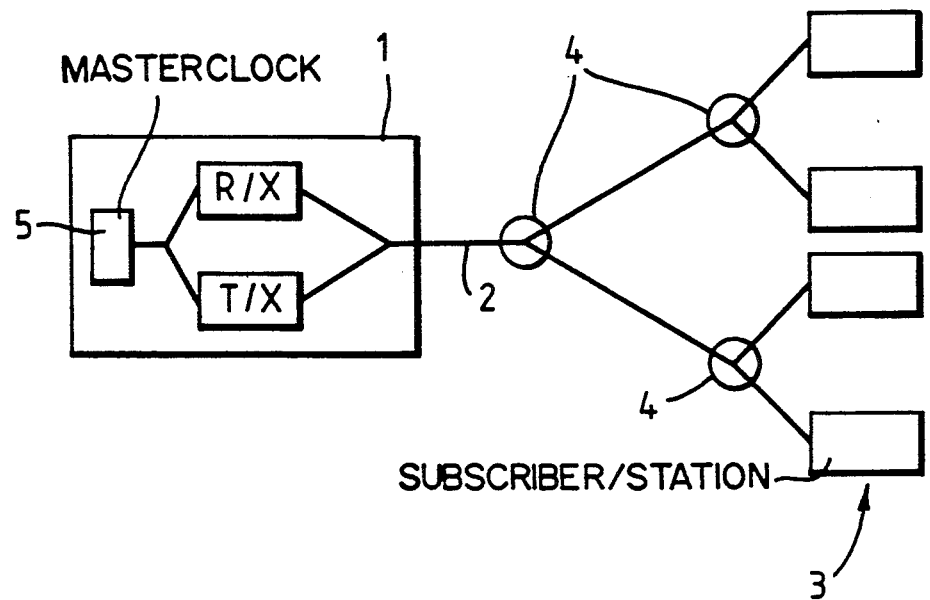
FIG. 1 is a diagram showing an optical network.

An optical network includes a central exchange 1 connected by optical fibres 2 to a number of subscriber stations 3. In the particular example described the optical network is passive, using splitters 4 at the nodes of the network to provide a tree and branch structure. The present invention however is equally applicable to different networks having different connectivities and can also be used with radio or cable networks.

In use, the central exchange 1 transmits packets of data to the subscriber stations 3 at a rate determined by a masterclock 5 formed in the exchange 1. Each subscriber station 3 recovers the clock from the received data packets using a conventional phase locked loop (PLL).

For the return transmission of data from the subscriber station 3 to the central exchange 1, each subscriber station transmits data at the frequency of the recovered clock and timed to an accuracy of ±1 clock cycles. However the phase of the transmission from the subscriber stations 3 differs by an arbitrary amount from the phase of the masterclock at the exchange and from the phase of transmissions from neighbouring subscriber stations 3.

Figure 2:
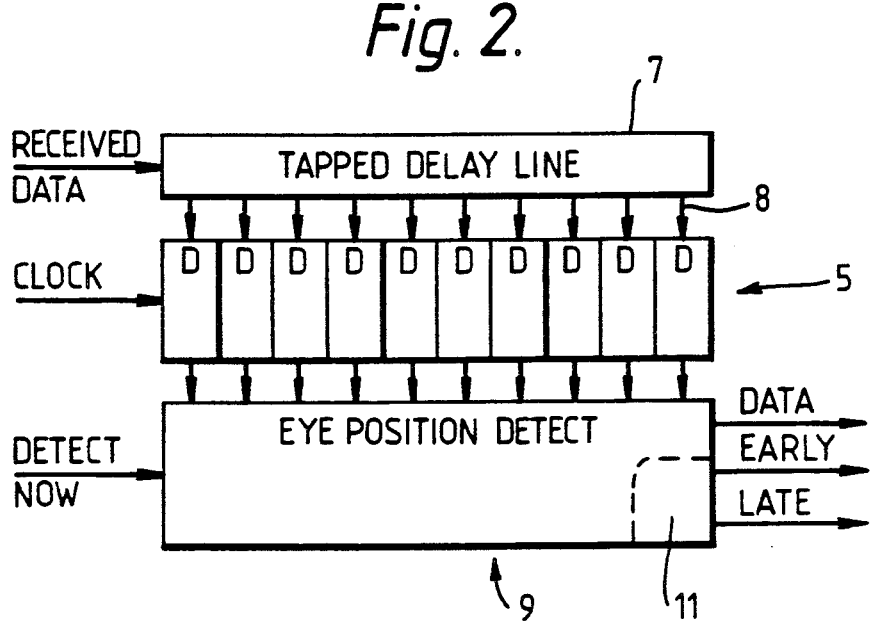
FIG. 2 is a block diagram of the receive circuit of the exchange.
Figure 4:
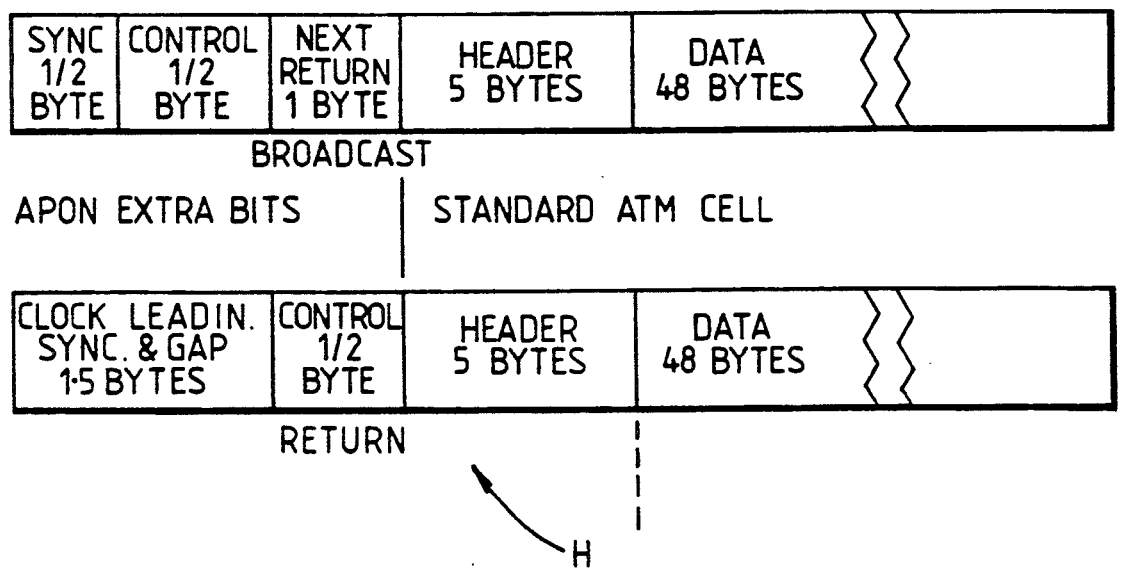
FIG. 4 is a diagram showing cell formats.

As shown in FIGS. 2 and 3, the central exchange includes on its receive side a phase alignment system which enables the exchange to handle received data using only its local masterclock 5 despite the arbitrary variations in phase.

The phase alignment system 6 includes a delay line 7 which receives the incoming data. The delay line 7 is a lumped constant line formed from discrete reactive components. The delay line 7 has a series of 30 taps arranged along the line, the taps corresponding to progressively increasing delays. In the particular example described, the delay line as a whole is 3 bits long and successive taps 8 are separated by a delay of 0.1 bits. A series of D type register 12 is arranged in parallel with the delay line, one register being connected to each tap 8. When the registers are strobed by the masterclock 8 they then capture the instantaneous values of the data on the different taps 8. The outputs of the registers are in turn sampled by the eye position detect circuit 9 which is strobed at the cell transmission rate. This circuit which is implemented in standard ECL logic determines from the sampled data which tap on the delay line 7 carries data corresponding in phase to the masterclock and outputs data from that tap accordingly.

Data cells are transmitted between the exchange and subscriber stations using an extended version of the standard ATM (Asynchronous Transfer Mode) cell format. This APON (ATM on passive optical network) format provides a clock lead-in at the head (H) of the cells for the return direction, that is from the subscriber station to the exchange. This lead-in has a distinctive bit pattern which in the present example is simply a binary 1 bounded by at least two binary 0's, one on either side. This pattern provides an "eye" the position of which is determined by the eye position detect circuitry in order to identify the appropriate tap.

Figure 5:
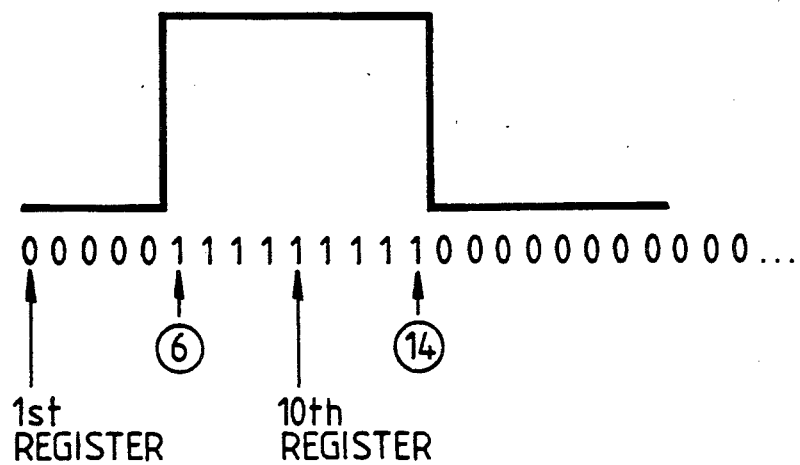
FIG. 5 is one example of a bit pattern held in the registers of the circuit of FIG. 2.

FIG. 5 shows a typical example of the data from the delay lines held in the D type registers. The eye detect circuitry 9 includes a pair of latched priority encoders 10 which determine the position of the first from the left and from the right of the series of registers respectively. In the present example therefore these would return the values of the 6th and 14th registers. The values are then added and divided by 2, by discarding the least significant bit, to give the value of the register at the centre of the eye pattern, which in the present example is the 10th register. Since the datastream was initially sampled by the D registers in phase with the masterclock and the datastream on the corresponding 10th tap was centred on the eye pattern that data stream is known to be in phase with the masterclock and so thereafter is used to provide the data output. Since the line 7 is 3 bits wide there are in general 3 outputs matched in phase to the masterclock. Choosing only that one output at which the eye is centred ensures that the data is not only synchronised to the masterclock but also to the cell transmission rate, considerably simplifying the handling of the data output by the system.

In practice it is found that the performance of the system is further improved if instead of relying upon a single determination the output is selected upon the basis of, e.g., a rolling average of the results of the calculations for the present sample and, e.g., the two preceding samples made by the eye position detect circuitry for cells from the same subscriber station as the current data cells. The system is then less prone to jitter in response to noise creating a spurious transition in the received data. These cells may of course be separated by cells from other subscriber stations. The logic circuit is able to determine which samples relate to which subscriber stations by reference to information carried in the header of the APON cells indentifying the stations concerned.

In order to remove some of the constraints on the timing of the above processes it is found to be advantageous to offset the calculations by one sample: the tap for outputting the nth cell from a given subscriber station is then chosen on the basis of calculations made for the (n−3)th, (n−2)th and (n−1)th cells from that station.

To prevent the predetermined bit pattern wandering outside the 3-bit-wide window defined by the delay line 7 the eye position detect circuitry 9 also includes a control circuit 11 arranged to generate control signals which are transmitted back to the subscriber stations to modify the timing of the transmission of data. These control signals, which can be derived simply by comparing the values from the priority encoders with predetermined ideal values, indicate whether the data cells are arriving at the exchange early or late and cause the subscriber stations to retard or advance the transmission of data accordingly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A network comprising:
    exchange means;
    a plurality of subscriber stations;
    means operatively connecting said plurality of subscriber stations to said exchange means for communication of data cells therebetween;
    a masterclock operating at a masterclock frequency provided in said exchange means;
    said subscriber stations including means to recover said masterclock frequency from data cells communicated by said exchange means, and means to transmit data cells back to said exchange means at said masterclock frequency;
    delay line means provided in said exchange means for receiving incoming data cells;
    a plurality of outputs provided in said delay line means, said outputs exhibiting arbitrary phase relationships with respect to said masterclock; and
    means to sample data from said plurality of outputs to determine which output carries data optimally in phase with said masterclock, and for selecting said optimally in phase output for outputting a data cell.

2. The network of claim 1, wherein said data cells transmitted by said subscriber stations include a header portion and a predetermined bit pattern provided in said header portion and said means to sample include means to identify positions of said predetermined bit pattern in data from said plurality of outputs.

3. The network of claim 2, wherein means to generate and transmit control signals are provided in said means to sample, said means to generate and transmit outputting control signals via said means operatively connecting to said subscriber stations, retarding the transmission of cells from said subscriber stations when said predetermined bit pattern is found to be advanced with respect to the center of said delay line means, and advancing transmission of cells from said subscriber stations when said predetermined bit pattern is determined to be retarded with respect to the center of said delay line means.

4. The network of claim 1, further comprising means to strobe said means to sample at a cell transmission rate of said subscriber stations.

5. The network of claim 1, wherein said means operatively connecting comprise an optical fibre network.

6. The network of claim 1, wherein said means to sample are arranged to select said one of said outputs for outputting a data cell from a subscriber station in accordance with a determination of which output is optimally in phase for a preceding data cell from said subscriber station.

7. The network of claim 1, wherein said means to sample include averaging means arranged to calculate a rolling average of determinations of which output is optimally in phase, and said means to sample are arranged to select said output in accordance with said rolling average.

8. The network of claim 3, further comprising means to strobe said means to sample at a cell transmission rate of said subscriber stations, and wherein said means to sample include averaging means arranged to calculate a rolling average of determinations of which output is optimally in phase, and said means to sample are arranged to select said output in accordance with said rolling average.

9. A method of communicating data in a network, said network including an exchange means having a means for generating a masterclock frequency, a plurality of subscriber stations, and means operatively connecting said plurality of subscriber stations to said exchange means for the communication of data cells therebetween, said method comprising:
    transmitting data at said masterclock frequency from said exchange means to said subscriber stations;
    recovering said masterclock frequency at said subscriber stations from said transmitted data;
    transmitting a data cell from a subscriber station to said exchange means at said masterclock frequency;
    at the exchange applying different progressive delays to said received data cell thereby providing a plurality of different outputs having different respective phases;
    sampling said different outputs;
    determining which output is optimally in phase with said masterclock, and
    outputting a data cell from a selected one of said outputs which is optimally in phase with said masterclock.

10. The method of claim 9, wherein said data cells include a header portion and a predetermined bit pattern provided in said header portion, and said step of determining which of said different outputs is optimally in phase with said masterclock includes determining a position of said predetermined bit pattern within data from said different outputs.

11. The method of claim 10, further comprising transmitting control signals from said exchange means to said subscriber station thereby retarding transmission of cells from said subscriber stations when said predetermined bit pattern is found to be advanced, and advancing the transmission of cells from said subscriber stations when said predetermined bit pattern is determined to be retarded.

12. The method of claim 9, wherein said step of determining which output is optimally in phase with said masterclock is repeated at a cell transmission rate of said subscriber stations.

13. The method of claim 9, wherein said one of said outputs for outputting a data cell from a subscriber station is selected in accordance with a determination of which output is optimally in phase for a preceding data cell from said subscriber station.

14. The method of claim 9, wherein a rolling average of said determination of which output is optimally in phase is calculated, and said output for outputting a data cell is selected in accordance with said rolling average.

15. The method of claim 11, wherein said step of determining which output is optimally in phase with said masterclock is repeated at a cell transmission rate of said subscriber stations, and wherein a rolling average of which output is optimally in phase is calculated from determinations for a plurality of data cells from a subscriber station, and an output for outputting a succeeding data cell from said subscriber station is chosen in accordance with said rolling average.

* * * * *